United States Patent
Huuhtanen et al.

(10) Patent No.: US 10,587,217 B2
(45) Date of Patent: Mar. 10, 2020

(54) SOLAR POWER SYSTEM AND METHODS, USE AND COMPUTER READABLE MEDIUM RELATING TO MONITORING SOLAR POWER PRODUCTION

(71) Applicant: SOLA SENSE OY, Salo (FI)

(72) Inventors: Timo Huuhtanen, Salo (FI); Markku Nieminen, Vantaa (FI); Ville Tulonen, Sauvo (FI)

(*) Notice: Subject to any disclaimer, the term of this patent is extended or adjusted under 35 U.S.C. 154(b) by 0 days.

(21) Appl. No.: 16/107,789

(22) PCT Filed: Feb. 17, 2017

(86) PCT No.: PCT/FI2017/050102
§ 371 (c)(1),
(2) Date: Nov. 19, 2018

(87) PCT Pub. No.: WO2017/144772
PCT Pub. Date: Aug. 31, 2017

(65) Prior Publication Data
US 2019/0393828 A1    Dec. 26, 2019

(30) Foreign Application Priority Data
Feb. 23, 2016   (FI) ...................... 20165140

(51) Int. Cl.
*H02S 20/32*    (2014.01)
*H02S 50/10*    (2014.01)
*F24S 50/20*    (2018.01)
*G01S 3/786*    (2006.01)
*H02J 3/38*    (2006.01)

(52) U.S. Cl.
CPC .............. *H02S 20/32* (2014.12); *F24S 50/20* (2018.05); *G01S 3/7861* (2013.01); *H02J 3/383* (2013.01); *H02S 50/10* (2014.12)

(58) Field of Classification Search
None
See application file for complete search history.

(56) References Cited

U.S. PATENT DOCUMENTS

2009/0182532 A1    7/2009   Stoeber et al.
2011/0297141 A1    12/2011  Correia et al.
(Continued)

FOREIGN PATENT DOCUMENTS

DE    102010041126 A1    3/2012
KR    101530968 B1       6/2015

*Primary Examiner* — Eli S Mekhlin

(57) ABSTRACT

The invention relates to a solar power system and method of monitoring a solar power system. The system comprises one or more stationary solar energy modules supported by a support structure, at least one sensor connected to at least one of the stationary solar energy modules or to the support structure for providing measurement data, and a data transfer unit (16) functionally connected to the sensor for receiving the measurement data and adapted to transmit said measurement data to data analysis unit. According to the invention, the at least one sensor is an acceleration sensor adapted to measure acceleration of said at least one stationary solar energy module or the support structure as the measurement data. The invention allows for detecting mechanical failures caused by environmental factors, for example, in stationary solar power plants at an early stage.

9 Claims, 6 Drawing Sheets

(56) References Cited

U.S. PATENT DOCUMENTS

2016/0254698 A1* 9/2016 Anderson .......... H01M 10/465
                                                   320/101
2017/0318919 A1* 11/2017 Gharabegian .......... A45B 25/00

* cited by examiner

SOLAR POWER SYSTEM AND METHODS, USE AND COMPUTER READABLE MEDIUM RELATING TO MONITORING SOLAR POWER PRODUCTION

FIELD OF THE INVENTION

The invention relates to monitoring of solar power systems. In particular, the invention relates to monitoring of systems comprising one or more polar energy modules, such as photovoltaic panels.

BACKGROUND OF THE INVENTION

Solar power systems collect energy from solar radiation. For example, solar photovoltaic (PV) systems generate electricity from solar radiation. A solar photovoltaic system consists of one or more photovoltaic modules each of which generates electrical current and voltage. The modules are connected electrically together into strings. The combined electricity generated by all the panels in the string is then fed with cables into an inverter, which converts the DC voltage into AC voltage and feeds it into the power grid. Since the energy intensity of one PV module is low, typically several dozens, hundreds or thousands of PV modules are needed in one PV system. Additionally, all the PV panels need to be placed such a way that they do not shade each other. Thus, PV systems require large physical space and they are typically placed on roofs or walls of buildings or on ground-mounted support structures in fields, deserts or other open areas.

Another solar power system type utilizes solar thermal collector modules, which, instead of producing directly electricity, absorb and recover heat from sunlight, typically using water as a heat reservoir. As an example of solar thermal collectors solar hot water panels are mentioned. The hot water produced can be used directly as a heat source or to run a turbine for indirect production of electricity.

Solar power systems can be stationary, i.e. with non-moving solar energy modules, or non-stationary, i.e. with solar energy modules that can be tracked according to the current position of the sun. CN 202150053 discloses a tracking PV system in which acceleration sensors are used to detect the position of the moving panel for achieving optimal orientation of the panel with respect to the sun.

Solar energy modules in typical installations are exposed to strong winds, storms or rain. Also other environmental factors such as vandalism may cause load for the mechanical support structure of a module. If the support structure breaks down in strong wind, the loose panel may cause serious damage for the module itself, other modules, roof structures and other structures as well as human beings nearby. Manufacturers, installers and/or owners of solar power systems therefore need to have information of the condition of the modules used. Typically, the mechanical condition of a solar power system is monitored by a maintenance person physically visiting the system and manually checking the fixture of each module. This is naturally time-consuming and often does not reveal problems that cannot be visually seen. Systems are also often built to remote locations on ground or on the top of buildings (roof top system) and thus they are difficult to reach.

It is known to collect information from the solar system by remote monitoring of electrical properties (voltage and current) and/or temperature of individual modules with suitable sensing circuits. This way, malfunction of the modules can be remotely detected. For example WO 2008/012041 and U.S. Pat. No. 6,545,211 disclose monitoring of electrical properties of photovoltaic systems.

US 2009/182532, DE 102010041126 and KR 101530968 disclose using acceleration sensors in connection with photovoltaic modules for providing an alarm in the case of theft or strong wind, for example.

However, known solar power system monitoring methods are poorly or not suitable for detecting and preventing upcoming failures in advance. In particular, they are incapable of taking into account physical and environmental factors affecting the solar energy modules. There is thus need for improved solar power systems and methods for monitoring them.

SUMMARY OF THE INVENTION

It is an aim of the invention to provide a stationary solar power system and a monitoring method with improved failure detection capability. It is also an aim to provide a system whose mechanical condition can be better monitored, and a corresponding monitoring method. A particular aim is to provide a solution which can be used for detecting slackened fixtures of solar energy modules early enough, so that they can be fixed before more serious damages take place.

These aims are met by the invention as hereinafter described and claimed.

The invention is based on the observation that acceleration sensors can provide crucial information on the mounting and condition of solar energy modules even if the modules are mounted in stationary positions. For example, change in the vibrational behaviour or orientation of a photovoltaic module, both of these being detectable by an acceleration sensor, over time indicates that the fixation of the module has become loose and may produce severe problems if not fixed early enough. On the other hand, differences between vibration behaviours of different modules or even in different directions of a single module may indicate bad mechanical condition of a system or at least stress experienced by the system.

The solar power system according to the invention comprises one or more stationary solar energy modules supported by a support structure, one or more sensors connected to at least one of the stationary solar energy modules or to the support structure for providing measurement data, and a data transfer unit functionally connected to the sensor for receiving said measurement data and adapted to transmit said measurement data to the data analysis unit. According to the invention, the sensor is an acceleration sensor adapted to measure acceleration of the stationary solar energy module or the support structure as said measurement data.

The present method comprises monitoring a solar power system comprising one or more stationary solar energy modules attached to a support structure by providing measurement data from at least one of said solar energy modules or said support structure using an acceleration sensor attached to said at least one solar energy module or to said support structure, transmitting the measurement data to a data analysis unit, and receiving from the data analysis unit monitoring data representing the condition of the solar power system, the monitoring data being computed based on the measurement data.

Analysis in the analysis unit may comprise reading measurement data comprising a plurality acceleration values from a plurality of sources measured during a time period, the acceleration values comprising information on acceleration magnitude and direction associated with time values indicating measurement time, and using the acceleration values to calculate index values describing acceleration characteristics of said sources. According to various aspects of the invention, the index values are calculated by comparing acceleration values from each source at different measurement times, comparing acceleration values from at least two different sources at the same measurement time, and/or deriving at least one statistical parameter from acceleration values of each source.

The analysis is preferably carried out on a computing device comprising a computer readable medium comprising executable program code which, when executed on a computer, is adapted to perform the abovementioned analysis steps, or further steps described elsewhere in this document.

Considerable advantages are gained by means of the invention. In particular, in the present system mechanical failures or threatening failures can be detected in time before more severe incidents. Some of the key benefits include that maintenance actions can be done timely and damages caused by loosened or broken fastening can be avoided.

The invention provides an innovative use for acceleration sensors, which are conventionally used for measuring the mechanical state of objects that are intended to move in order to characterize their movement or orientation. Contrary to that, the present invention uses acceleration sensors to monitor stationary solar energy modules, which are affixed in place as firmly as possible, and are not intended to move during their entire lifetime. An essential part of the invention is the perception that even in the stationary acceleration sensors can provide crucial information on the mechanical condition of the modules. In particular, modern microelectromechanical sensors are sensitive enough to provide enough information for monitoring, preferably using the analysis principles and algorithms herein described.

The invention is particularly suitable for monitoring the condition of photovoltaic panels, but may also be applied in thermal collector systems, for example those comprising a plurality of similar vacuum tube collector modules.

According to one embodiment, the acceleration sensor is adapted to provide measurement data characterizing vibrations of the solar energy module and/or the support structure. The acceleration sensor may additionally be adapted to provide measurement data indicating orientation of the solar energy module or the support structure. Either the vibrations or orientation, or both of them together, can be used to monitor the mechanical state of the module or support structure and therefore to detect potential failures.

According to one embodiment, the number of solar energy modules supported by the support structure is two or more and there are at least two sensors associated with at least two different solar energy modules. Moreover, the plurality of sensors are functionally connected to the data transfer unit for transmitting of solar energy module specific measurement data to the data analysis unit. The data transfer unit acts as a gateway between the sensors and the analysis unit. According to one embodiment, the number of sensors attached to different modules and connected to the data transfer unit is 10 or more, for example 100 or more. There may be a plurality of such sensor and data transfer unit groups, such that all data transfer units are, however, connected to a single analysis unit, where the data is eventually collected for analysis.

According to one embodiment, the data analysis unit comprises an external data server not part of the local solar power system and the data transfer unit is adapted to transmit data thereto over a network connection. The data server can be cloud server, which is physically located elsewhere or have a distributed architecture. Such data server may serve for analysing data collected from several solar power production sites potentially having different owners.

According to an alternative embodiment, the data analysis unit comprises a local data server, which is typically part of the solar power system. Such server is typically located at the solar power production site or at least in the same country and dedicated to serve for the analysis of that particular site or many sites of the same solar power production entity.

The data analysis unit is capable of analysing, and optionally also storing, the measurement data. In some embodiments, there are provided means for performing an analysis comprising temporal analysis of data provided by a single sensor and/or comparative analysis between simultaneously collected data provided at least two different sensors connected to different solar energy modules. In one embodiment, the data analysis unit comprises means for performing a statistical analysis for each single sensor's data for example for determining wind stress affecting the corresponding modules or support structures.

According to one embodiment, the system comprises a terminal device adapted to receive processed data from the data analysis unit and to present the processed data, or data derived therefrom, to a user.

According to one embodiment, there is provided one or more processing units connected between each acceleration sensor and data transfer unit, the processing unit being adapted to read the measurement data from the sensor according to a predefined readout scheme, for example at predefined intervals and sampling frequency. Further, the processing units may be adapted to perform at least one data pre-processing operation for the measurement data, and to provide said pre-processed measurement data to the data transfer unit. Examples of data pre-processing operations include averaging, filtering, integration and Fourier transform operations and combinations of these. Data pre-processing may reduce the amount of data needed to be sent to the gateway and further to the analysis unit.

In case movement, i.e. vibrations, is measured, the sampling frequency can be e.g. 50-2000 Hz, in particular 100-1000 Hz, such as 100-800 Hz, for each dimension of the sensors. Typically, a Fourier transform of the readout signal is computer in the processing unit. In case orientation is measured, readout of single acceleration values for each dimension of the sensors is sufficient. The sampling interval, i.e. delay between successive readouts depends on the type of analysis desired and is typically 1 s or more, such as 1 month-1 s, for example 1 hour-1 s for each sensor.

According to one embodiment, herein called "spatial monitoring", the movement and/or orientation of at least two separate solar energy modules are measured and transmitted to the data analysis unit for further analysis.

In one embodiment, herein called "temporal monitoring", the movement and/or orientation of at least one solar energy module or support structure at two different time points are measured and transmitted to the data analysis unit for further analysis. In temporal analysis, the interval between the different time points is typically at least one week.

In one embodiment, herein called "statistical monitoring" the movement (vibrations) of at least one solar energy module or support structure in three dimensions is measured transmitted to the data analysis unit for further analysis using statistical methods. Wind stress monitoring is an example of statistical monitoring.

According to one embodiment, the method comprises also receiving processed monitoring data from the data analysis unit, for example to the terminal device referred to above.

According to one embodiment, the method comprises also the analysis steps carried out in the analysis unit.

According to one embodiment, the analysis comprises computing at least one index value from the measurement data, and transmitting the index value to the terminal device.

Embodiments of the analysis comprise, in accordance with the "temporal monitoring", "spatial monitoring" and "statistical monitoring" schemes described above

- extracting from the measurement data acceleration data measured by a single acceleration sensor at least at two different time points, the time points preferably having an interval of at least one week, and calculating at least one index value descriptive of the change in movement and/or orientation characteristics of said single acceleration sensor (temporal analysis),
- extracting from the measurement data acceleration data measured by at least two different sensors connected to different solar energy modules, and calculating at least one index value descriptive of the difference in movement and/or orientation characteristics of said at least two different acceleration sensors (spatial analysis), and
- extracting from the measurement data acceleration components of at least one acceleration sensor in three dimensions, calculating dimension-specific statistical values based on said acceleration components, and calculating at least one index value descriptive of dimension-specific movement behaviour of said acceleration sensor (statistical analysis).

Next, embodiments of the invention and advantages thereof are discussed in more detail with reference to the attached drawings.

DETAILED DESCRIPTION OF EMBODIMENTS

The term "(solar power) module" refers to any unit capable of and intended to recover energy from solar radiation in to another form or energy, typically electricity or heat. Typical solar power plants comprise a huge amount of similar modules arranged in a grid.

"Stationary (solar power) module" refers to a module, which is fastened to a support structure such that no macroscopic movement of the module can take place under ordinary conditions. In particular, the term "stationary" is used to make a difference to tracking modules arranged on a support structure capable of rotating to face towards the sun and mobile modules arranged e.g. on vehicles. The term "stationary" naturally does not exclude microscopic movement, i.e. vibration, of the modules, as the existence of microscopic movements are key factors in several embodiments of the invention (all but purely orientation based embodiments).

A "support structure" refers to any rigid assembly through which the modules are supported on ground or on a building, for example, in stationary positions and orientations.

"Acceleration sensor" refers to any device capable of detecting force applied thereto in at least one dimension and providing a reading descriptive of the magnitude of the force in analog or digital form. In principle, one-, two or three-dimensional acceleration sensors can be used, but three-dimensional sensors are preferred for obtaining as much mechanical information from the modules as possible. In typical embodiments, the accelerations sensors are translational accelerometers, but also rotational accelerometers, i.e. gyroscopes, can be used. In particular, the term "acceleration sensor" covers microelectromechanical (MEMS) sensors.

The term "measurement data" refers to raw data provided by one or more acceleration sensors, or data pre-processed based on the raw data in a data processing unit. In particular, the measurement data may contain information on the magnitude and direction of acceleration at least at a single point of time or plurality points of time. The "points of time" refer to instantaneous moments or periods over which acceleration is averaged.

Several embodiments of a method and a system for monitoring the condition of the mechanical status or fixture of photovoltaic solar energy modules or mechanical support of one or several modules of a solar power system are described below in detail. Further, means for obtaining an early warning about a threatening mechanical failure of the solar power system are described.

System

Figure 1A:
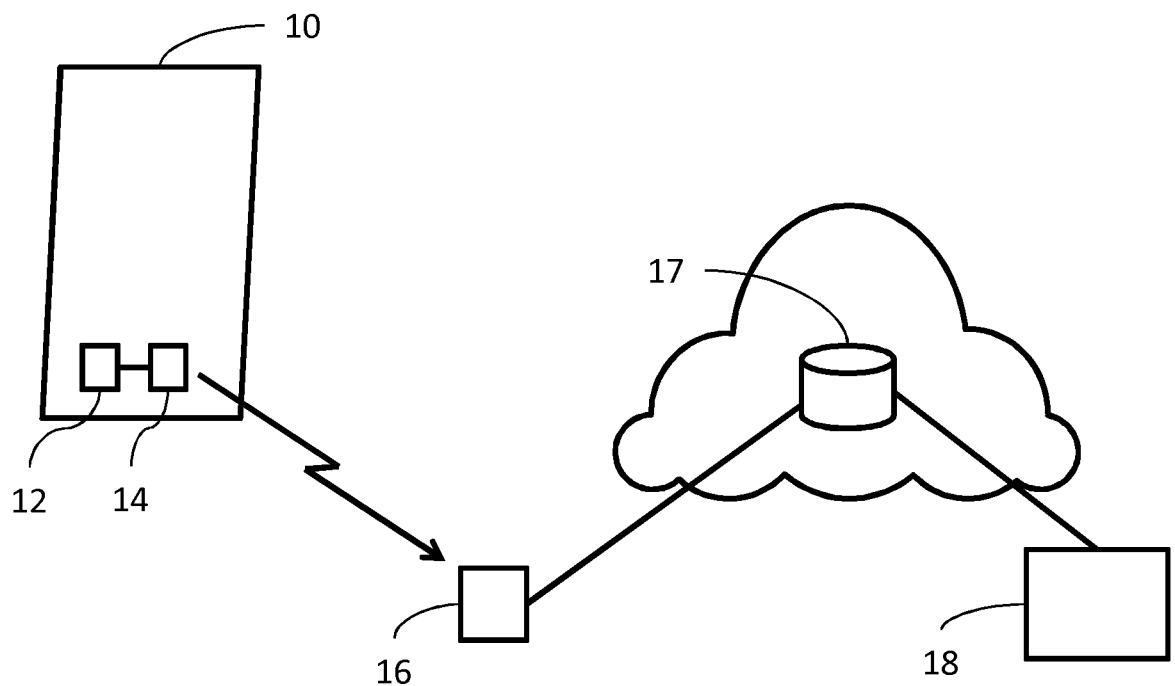
FIGS. 1A and 1B shows block diagrams of the present system according to two embodiments with sensors attached to solar energy modules.

FIG. 1A shows a system comprising a solar panel 10 as the solar energy module to be monitored. An acceleration sensor 12 is mechanically affixed to the solar panel 10 and further electrically connected to a processor unit 14 which controls the acceleration sensor and receives measurement data therefrom. The processor transmits the measurement data further to data transfer unit, herein called a gateway 16, which is in network connection with an analysis unit 17, in this case a cloud server, capable of storing the measurement data in bigger amounts than the processor or the gateway and analysing the measurement data for monitoring purposes. Moreover, there is a terminal device 18 connected to the analysis unit 17 and adapted to receive results of measurement data analysis and typically also for presenting them to a user.

Figure 1B:
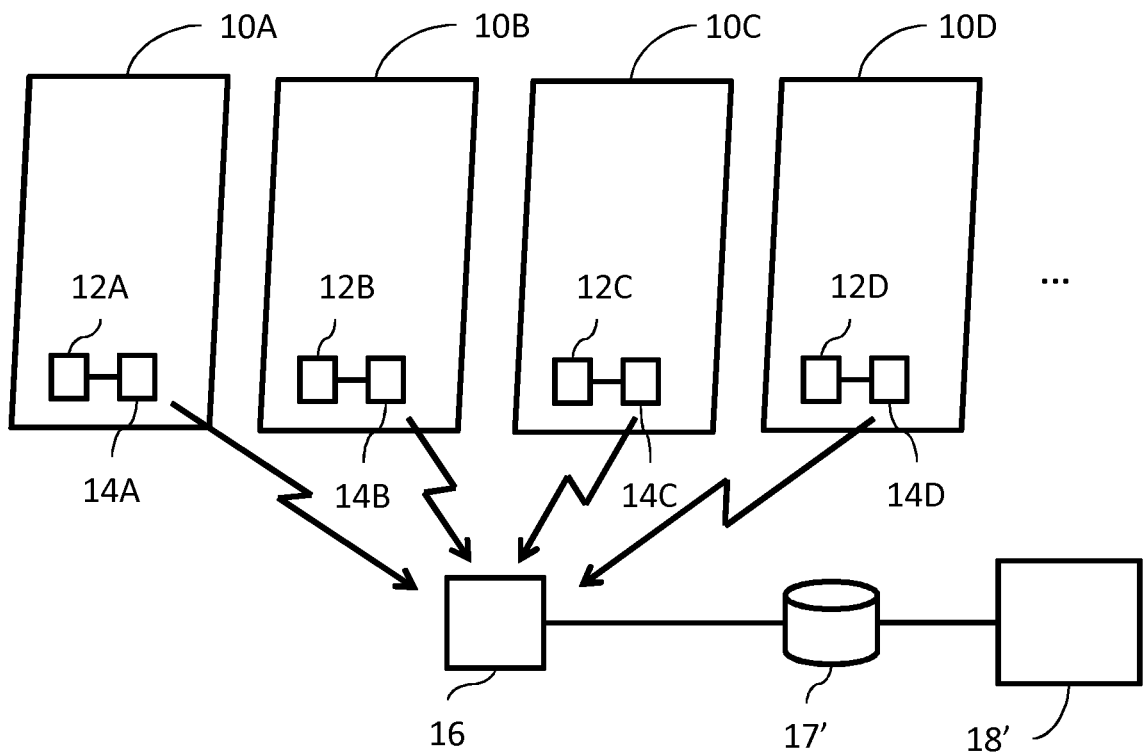

FIG. 1B shows a system with a plurality of solar panels 10A-D each provided with an attached acceleration sensor 12A-D and computing unit 14A-D, correspondingly. Each of the computing units 14A-D communicates with the gateway 16, which collects the measurement data of each of the sensors 12A-D and further transmits the information to an analysis unit 17'. The terminal device 18' is connected to the analysis unit 17' for retrieval of the data. In this illustration, the analysis unit 17' is a local server but it can as well be a cloud server, such as shown in FIG. 1A, and vice versa.

The acceleration sensors 12, 12A-D, and optionally also the computing units 14, 14A-D, are preferably mounted junction boxes (not shown) of the solar panels 10, 10A-D. In typical installations, each panel 10, 10A-D is in every case provided with a junction box through which the output power of the panel 10, 10A-D is guided, whereby no additional installation work is needed. Alternatively, they may be provided as one or two separate units on a front or back surface or on a frame of the solar panels 10, 10A-D. The sensors 12, 12A-D can be located symmetrically with respect to at least two, preferably all fixation points of the panels 10, 10A-D, whereby they is equally sensitive to vibrations of each such fixation point.

In addition to reading the sensors 12, 12A-D at a desired sampling frequency at predefined intervals or continuously, the processing units 14, 14A-D may be adapted to preform data pre-processing for the measurement data. For example, the processing units 14, 14A-D may filter (e.g. low-pass filter), average and/or integrate values read from the sensors 12, 12A-D, or to perform more complex data processing. One purpose for pre-processing is to reduce or compress information to be transmitted to further units of the system.

The raw or pre-processed measurement data is then transmitted further to the gateway 16. The connection between the processor units 14, 14A-D and gateways 16 can be wired or wireless. In case of large systems with several (tens, hundreds or thousands of) sensors 14A-D, wireless data collection provides significant advantages in terms of complexity and costs, as the need for a physical data bus is avoided. For this purpose, the processing units 14, 14A-D may comprise wireless transmitters. On the other hand, it is possible to use the power supply wires of the panels for data transfer, whereby no additional wiring is needed even if wireless transfer is not used.

The acceleration sensors 12, 12A-D and processing units 14, 14A-D are preferably powered by the solar panels 10, 10A-D themselves, whereby no external power supplies or extensive wirings are needed. Thus, power inputs of the processing units 14, 14A-D are typically connected to power outputs of the solar panels 10, 10A-D.

The acceleration sensor 12, 12A-D and processing unit 14, 14A-D may be separate components connected together by electrical wiring, but may as well be provided in a single component, typically integrated circuit, capable of performing both functions.

The gateway 16 collects data transmitted, and optionally pre-processed, by the processing units 14, 14A-D, and forwards the data to the analysis unit 17, 17', typically over an internet connection. The gateway 16 can comprise an embedded computer, for example. There may be provided a memory buffer in the gateway 16 so that data collected from the processing units 14, 14A-D, respectively, can be stored locally in case of network failures, for example.

The terminal device 18 can for example be a computer or a mobile device, such as a tablet or mobile phone, running a software capable of retrieving analysis data from the analysis unit 17, 17' over the internet. Optionally, the terminal 18 can also be capable of presenting the data for the user visually and/or triggering alarms based on the data if any of the module requires maintenance attention. For example, the terminal device can run a dashboard software capable of displaying the mechanical status of the solar energy modules to the user.

According to one embodiment, the acceleration sensors 12, 12A-D comprise three-dimensional accelerometers. Such sensors measure acceleration in three orthogonal directions, and in particular are capable of detecting all translational vibrations of the module. The output of the sensors is a set of three values indicating both the amplitude and the direction of the acceleration. Acceleration is due to the sum of forces subjected to the sensor and gravity of the earth is always one of these forces. Thus, if no other forces are present, the direction of the measured acceleration value indicates the position (orientation) of the sensor. Changes in the measured acceleration values indicate vibration or shocks due to wind or other external factors. Examples of suitable accelerometers include Kionix KXCNL-1010 and Freescale FXLS8471Q.

In real systems, the number of modules 10A-D and associated sensors 12A-D can be e.g. 100 or more, typically 1000 or more and even 10000 or more. Depending of the size of the system, in particular number of modules 10A-D, there may also be more than one gateways, each collecting data from a sub-group of modules. In very big systems there may be e.g. 10 or more or even 100 or more gateways.

The analysis unit 17, 17' receives the measurement data coming from the gateway(s) and stores the data in a database. Analysis algorithms running in the unit 17, 17' implement the analysis part of the method, i.e., using the stored measurement data to calculate values indicating the mechanical status of each module. Examples of analysis algorithms are given later in this document.

As shown in FIG. 1B, each photovoltaic module 10A-D preferably has its own accelerometer 12A-D and processor unit 14A-D. If a module has a panel-level monitoring and control unit for measuring the electrical properties of the module, the acceleration sensor can be integrated into the monitoring and control unit, and the processing unit and wireless connection of that unit may be used for pre-processing and/or transmitting acceleration values as well.

Instead of having an acceleration sensor attached to each module, only part of the modules of a system may have a sensor attached.

Figure 2:
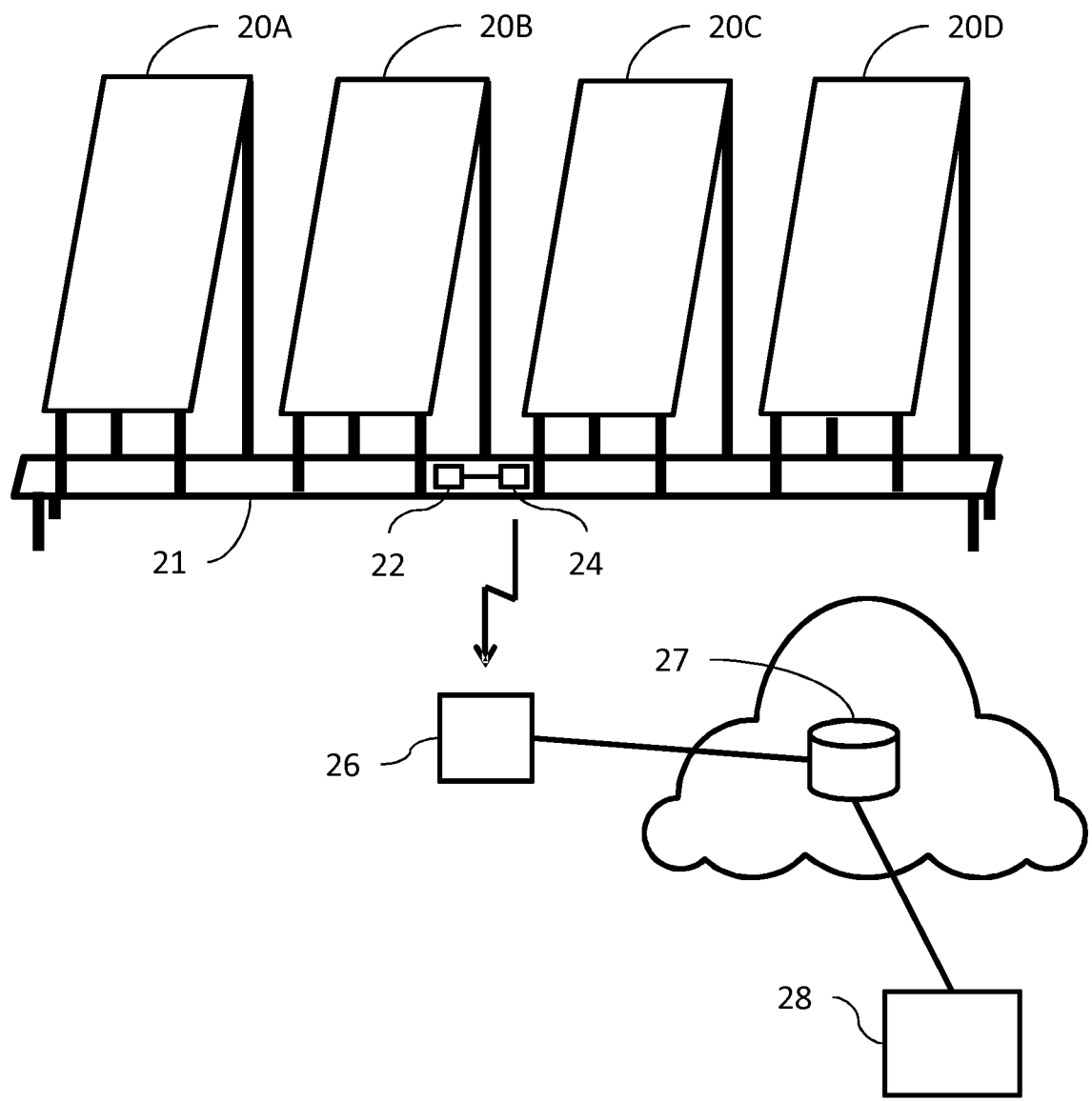
FIG. 2 shows a block diagram of the present system according to one embodiment with a sensor attached to a support structure of solar energy modules.

FIG. 2 shows an embodiment comprising solar energy modules 20A-D supported by a support structure 21. There is an acceleration sensor 22 and processing unit 24 attached to the support structure 21 instead of (or in addition to) the modules 20A-D. The acceleration sensor 22 is thus sensitive to movements of the support structure 21. In case of several sets of modules supported by a separate support structures, these support structures may be provided with different sensors. Since the movement any loose module 20A-D is reflected—at least to some extent—to movement of the support structure, faulty fixations can be localized to the support structure level. Alternatively, the support structure 21 itself may be poorly fixed and that can be detected too with the present arrangement and the faulty support structure 21 localized.

The monitoring system, i.e., sensors, computing units, gateways, analysis units and terminal devices, may be installed when the solar power production system is installed or at a later point of time, i.e., after the solar power production system has already been in use for some time (retrofit installations).

Analysis

Next, analysis algorithms briefly mentioned above are discussed in more detail with the aid of several examples.

As described above, measurement data is collected from the sensors of a system to an analysis unit. The data preferably includes three-dimensional acceleration data of each sensor at several points of time. The analysis unit comprises hardware and software means capable of executing program code that carries out one or more analysis algorithms using the measurement data as input.

There are three basic modes of analysis. In a temporal analysis the acceleration data of each single sensor are compared at two different points of time. In spatial analysis, the acceleration data of different sensors are compared at a single point of time. In statistical analysis, the acceleration characteristics of a single module during a short timeframe are analyzed in order to find out the amount of physical stress exerted on the module, for example. A combination of these is also possible.

Figure 3A:
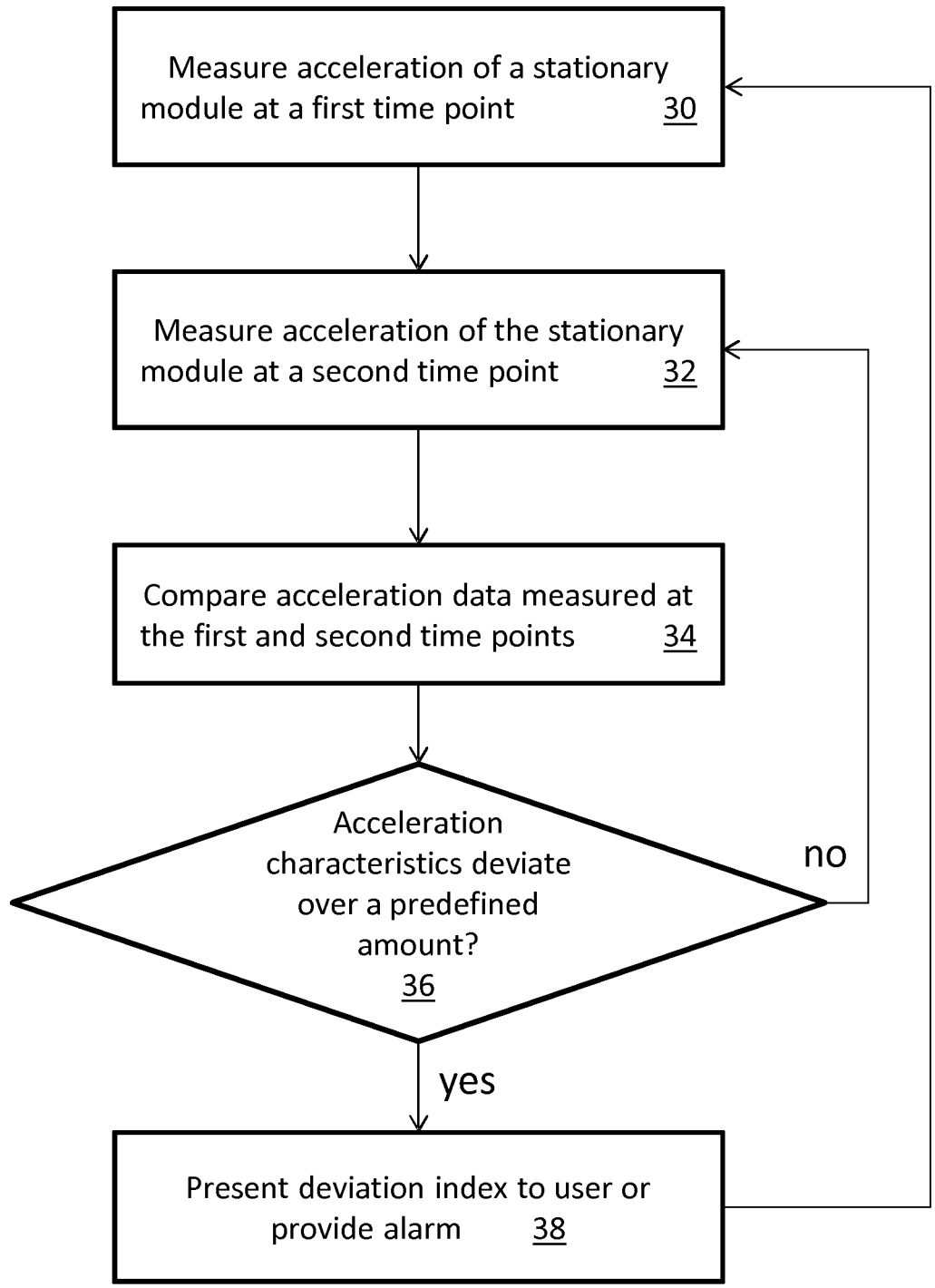
FIG. 3A shows a flow chart of a method according to one embodiment of the invention utilizing temporal acceleration analysis of a single module.

FIG. 3A illustrates the principle of temporal analysis. In step 30, acceleration data of a module is collected at a first point of time (first data). In step 32, acceleration data of the same module is collected at a second, later point of time (second data). In step 34, the first and second acceleration data are compared in order to be able to determine, in step 36, if the acceleration characteristics have changed. In practice, an index value which describes the magnitude of change of orientation and/or vibration of each module and/or support structure can be calculated. If the index value fulfills predefined criteria, the index is presented to the user in a suitable form or an alarm is provided in step 38.

Figure 3B:
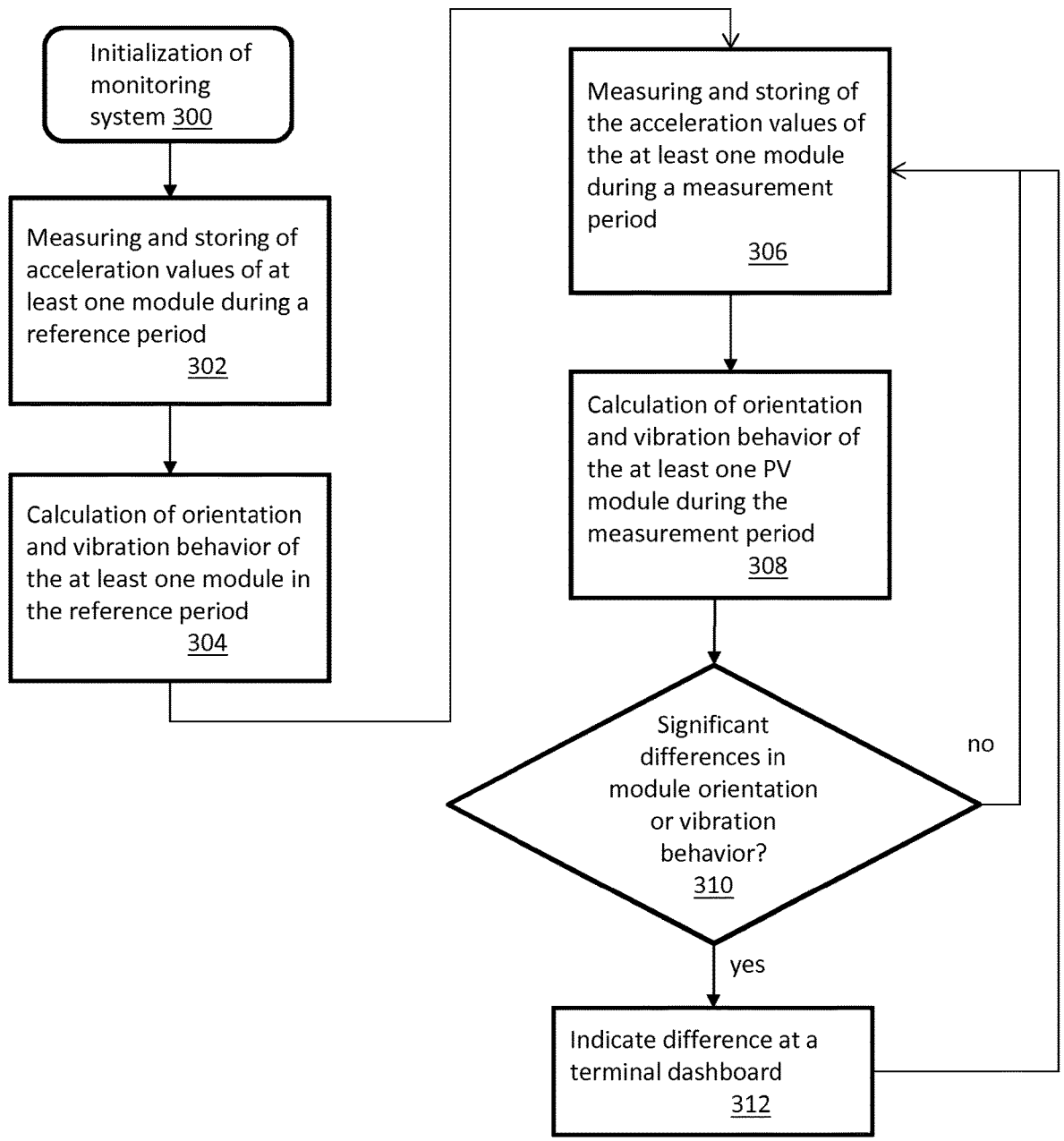
FIG. 3B shows a more detailed flow chart of a temporal acceleration analysis method according to one embodiment.

According to a further embodiment of temporal analysis illustrated in FIG. 3B, after initialization of the system (step 300) the first data is collected temporally close to installation of the solar power system (step 302), e.g. within a month from installation, and the second data recently (step 306), e.g. not longer than 24 hours back from current time, preferably essentially real-time. Right after the installation the solar power system is known to be mechanically in good condition. Thus, the first data forms 'steady state' reference data, preferably including sufficient data to determine the orientation and vibration behavior of each module and/or support structure (step 304). Then, corresponding values based on the second, more recent data are computed (step 308) and compared with the reference data (step 310) in order to find changes in acceleration characteristics of the modules and/or support structures, as described above. Potential differences can be presented on a terminal device, e.g. by a dashboard software (step 312).

In case of mechanical maintenance work performed for the modules, e.g. adjusting the fixation, removing, adding, or replacing individual modules, the reference data is preferably re-collected. For example, vibration characteristics of a new solar panel most likely differ from those of an old panel in the same location. One the other hand, extending a solar power system by new panels changes wind conditions among the old panels.

Figure 4:
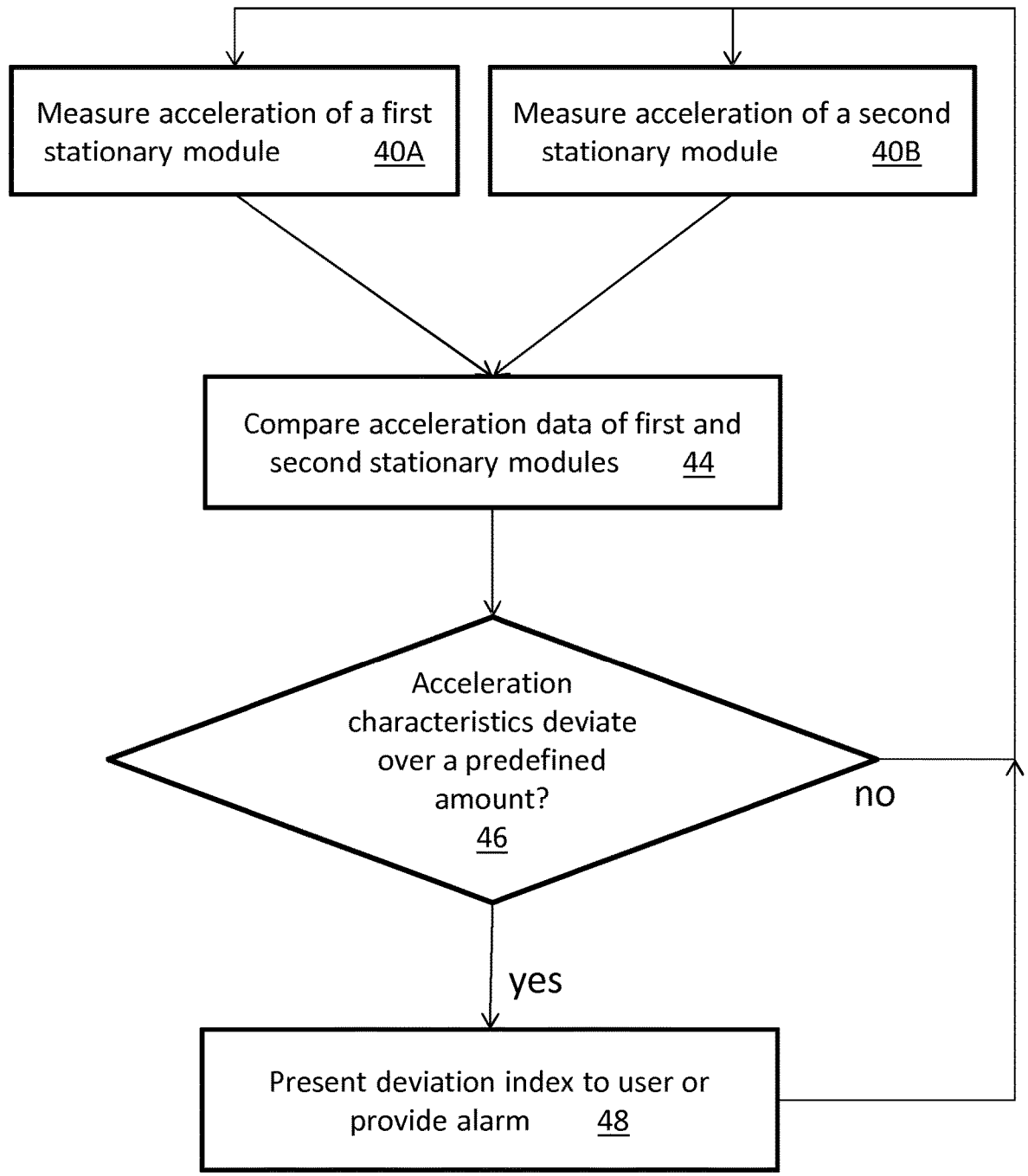
FIG. 4 shows a flow chart of a method according to one embodiment of the invention utilizing acceleration analysis between different modules.

FIG. 4 illustrates the principle of spatial analysis. In parallel steps 40A and 4B, accelerations of two different modules, first and second module, are simultaneously measured. After that, the acceleration data of the first and second modules are compared in step 44 in order to determine in step 46 whether they deviate more than a predefined amount. In the affirmative case, an index value describing the amount of deviation is presented to the user or an alarm is provided in step 48.

There may also be more than two different modules whose acceleration characteristics are compared according to the principle described above.

The modules compared in spatial analysis can be located e.g. on different positions of the same support structure supporting several modules or from the same locations of different support structures, which are typically arranged in a rectangular array.

Figure 5:
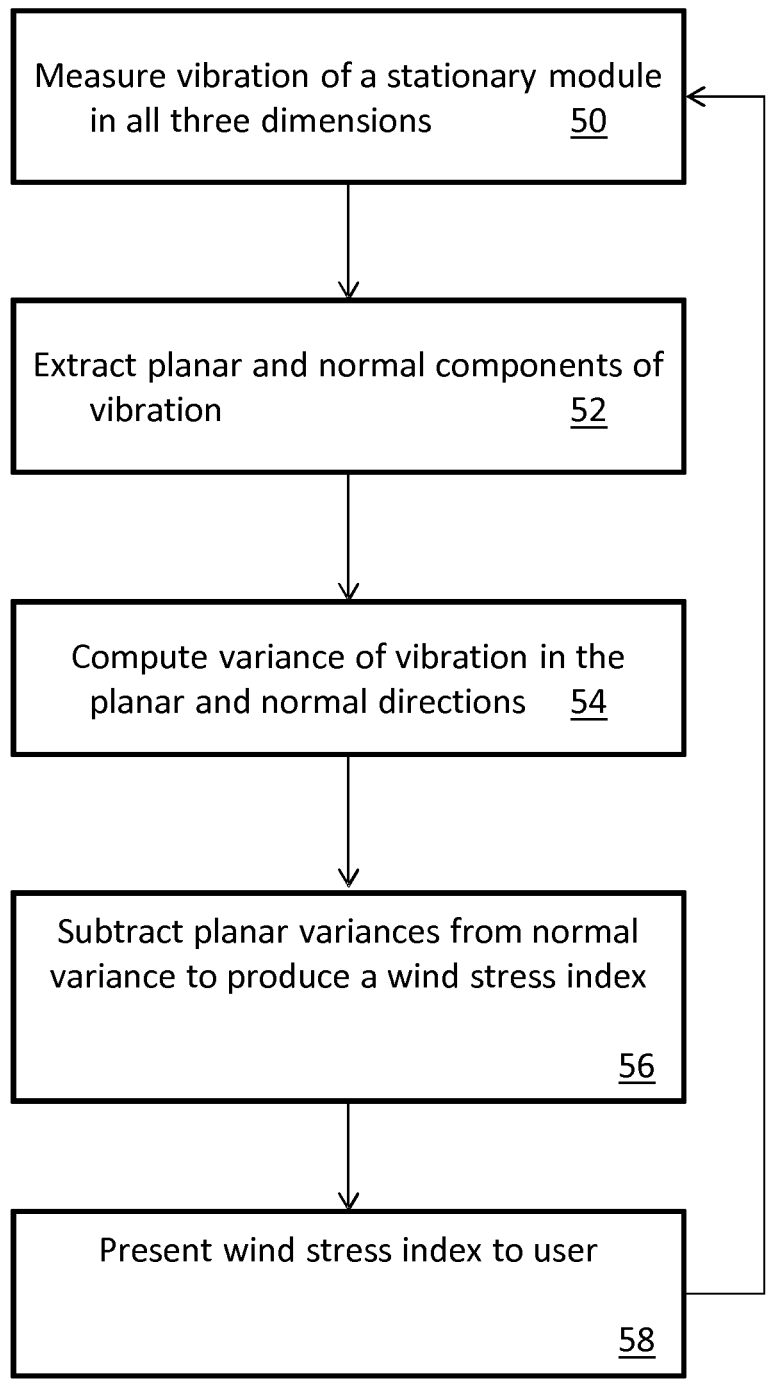
FIG. 5 shows a flow chart of a wind index calculation method according to on embodiment of the invention.

FIG. 5 illustrates the principle of stress analysis as an example of statistical analysis. In step 50, three-dimensional dynamic acceleration data, i.e. vibration data, of a module is measured. In step 52, the vibration components in each orthogonal direction of the module are determined based on the data. The components can be directed e.g. along the planar directions of the module and in the normal direction of the module. In step 54, a statistical quantity such as variance of vibration is calculated for each of these components. In step 56, the difference between these variances is determined e.g. by subtracting planar variance components from the normal component and using the obtained values to compute a wind stress index. In step 58, the wind stress index is presented to the user, or an alarm is provided if the index fulfills predefined criteria.

According to one embodiment, additional data obtained from the solar power system is used as part of the analysis. For example, in temporal analysis, it may be checked that one or more environmental factors, such as temperature and/or wind conditions and/or rain conditions and/or other weather conditions, are similar between the two time points. This ensures that the measurement conditions are comparable. The additional data can be obtained from additional sensors at the location of the solar power system or from e.g. external weather service.

An alarm provided for the user in case of a potential failure can be e.g. a graphical signal on a display, a (blinking) light, audible signal and/or e-mail notification, for example.

The analysis steps can be carried out in an analysis unit, which is typically a computer of any kind capable having a computer readable medium for storage of the measurement data and the analysis software, and a processor for executing the analysis software. The computer may be a local computer at the site of the solar power system, a networked computer in a different location but dedicated for the analysis of data from a particular site or a cloud server capable of analyzing data from a plurality of sites.

EXAMPLES

The following practical examples illustrate in detail some of the embodiments described above in more general level.

Example 1

PV Module Orientation Change

Background: A properly installed PV module is expected to stay in the same orientation during its lifetime. A change in the position indicates that there is something wrong with the module, its fastening or its support structures and, thus, maintenance operation is needed.

Inputs: Regular, frequent 3-axis acceleration value measurements in the PV module Process steps:
1. Acceleration values (in x-, y- and z-directions) are measured during a steady state period (e.g. during the first day after the installation)
2. The measured values are lowpass filtered to remove the impact of temporary phenomena. The resulting lowpass-filtered steady state acceleration vector value indicates the impact of gravity of the earth.
3. The steady state acceleration vector value is stored.
4. During normal operation of the PV system, acceleration values of the PV module are regularly measured.
5. The acceleration values are lowpass filtered to remove the impact of temporary phenomena.
6. The resulting acceleration vector value is compared to the steady state value; an index indicating the orientation change is calculated.

Output: An index indicating the orientation change of the module since the installation. Large value of the index indicates a mechanical problem.

Example 2a

Difference in PV Module Vibration Behavior Compared to Neighboring Modules of the Same System Background: In a PV system all the installed PV modules are mechanically similar and similarly fastened. The vibration behavior of every module is also expected to similar, e.g. when they are exposed to strong wind. Difference in the vibration behavior between the current module and its neighbors indicates that there is something wrong with the module, its fastening or its support structures and, thus, maintenance operation is needed.

Inputs: Regular, frequent 3-axis acceleration value measurements in the module and neighboring modules of the same PV system.

Process Steps:
1. During normal operation of the PV system, a sequence of acceleration values from each PV module is measured regularly with the same timing.
2. A measure indicating the vibration behavior of each module is calculated from these acceleration values. The measure may be e.g. variance of the measured acceleration value which then indicates the average energy of the vibration.
3. The measure of each module is compared against the average measure of the other modules. An index indicating the difference is calculated.

Output: An index indicating the difference of the vibration behavior of each module against the other modules in the neighborhood. Large value of the index indicates a mechanical problem.

Example 2b

Difference in the Vibration Behavior PV Module Compared to Neighboring Modules of the Same System As Example 2a, but instead of an individual module, a group of modules is being observed. Typically a row of modules is attached into same support structure. Mechanical problems in the support structure may then change the vibration behavior of all the modules in the same row. Thus, we could then detect the following cases:

One row of PV modules having mechanical problems in the support structures (e.g. all the modules in that row vibrating similarly with each other, but more than the modules in the other rows)

One end of the row having mechanical problems in the support structures (e.g. vibration increases from module to module of that particular row towards the end of the row)

Example 3

PV Module Vibration Behavior Change in Time

Background: A properly installed PV module is expected have the same kind of vibration behavior during its lifetime. A change in the vibration behavior indicates that there is something wrong with the module, its fastening or its support structures and, thus, maintenance operation is needed.

Inputs: Regular, frequent 3-axis acceleration value measurements in the PV module Process Steps:
1. A sequence of acceleration values are measured during a steady state period (e.g. during the first day after the installation).
2. The sequence is cut into pieces of suitable length; Fourier transform of each piece is calculated; the results are combined to indicate frequency domain vibration behavior during the steady state.
3. Characteristic frequencies are detected and stored.
4. During normal operation of the PV system, a sequence of acceleration values from the PV module is measured regularly.
5. The sequence is cut into pieces of suitable length; Fourier transform of each piece is calculated; the results are combined to indicate frequency domain vibration behavior during the current observation period.
6. Characteristic frequencies are detected, compared against the steady state values and an index indicating the difference is calculated.

Output: An index indicating the difference of the vibration behavior of the module against that during the steady state period. Large value of the index indicates a mechanical problem.

Example 4

Detecting the Stress Caused by Wind on a PV Module

Background: Because of the plate-like shape of a PV module the force caused by wind targets at the direction, which is perpendicular to the surface of the module (z-direction). Generally vibration is equally distributed between all the three directions. It is then possible to distinguish between the vibration caused by wind and vibration from other sources.

Inputs: Regular, frequent 3-axis acceleration value measurements in the PV module Process Steps:
1. A sequence of acceleration values of the PV module is measured.
2. Variance of the acceleration is calculated in all the three directions.
3. The average of variances in x- and y-directions is subtracted from the variance of z-direction.

Output: A value which indicates the stress caused by wind impact to the module.

The invention claimed is:

1. A solar power system comprising
   one or more stationary and non-tracking solar energy modules supported by a support structure, wherein the support structure is fixed in place,
   at least one sensor connected to at least one of the solar energy modules or to the support structure, said at least one sensor being an acceleration sensor adapted to measure acceleration of said at least one solar energy module or the support structure and configured to provide acceleration measurement data,
   a data analysis unit, and
   a data transfer unit functionally connected to the sensor and adapted to receive said measurement data and to transmit said measurement data to the data analysis unit, wherein
   the data analysis unit is configured to analyse the measurement data by temporal analysis of data provided by a single sensor and/or comparative analysis between data provided by at least two different sensors connected to different solar energy modules.

2. The solar power system according to claim 1, wherein the acceleration sensor is adapted to provide measurement data characterizing vibrations, and optionally orientation, of the solar energy module and/or the support structure.

3. The solar power system according to claim 1, wherein the number of solar energy modules supported by the support structure is two or more, and there are at least two sensors associated with at least two different solar energy modules, and the plurality of sensors are functionally connected to said data transfer unit for transmitting of solar energy module specific measurement data to the data analysis unit.

4. The solar power system according to claim 1, wherein the data analysis unit comprises a cloud server, and the data transfer unit is adapted to transmit data thereto over a network connection.

5. The solar power system according to claim 1, wherein the data analysis unit is configured to store the measurement data.

6. The solar power system according to claim 1, comprising a terminal device adapted to receive processed data from the data analysis unit and to present the processed data, or data derived therefrom, to a user.

7. The solar power system according to claim 1, comprising one or more processing units connected between each acceleration sensor and data transfer unit, the processing unit being adapted to read the measurement data from the sensor according to a predefined readout scheme.

8. The solar power system according to claim 7, wherein the processing units are configured to receive said measurement data from the sensor, to perform at least one data pre-processing operation for the measurement data, and to provide said pre-processed measurement data to the data transfer unit, the at least one data pre-processing operation comprising an averaging, filtering or integration operation, or a combination of these.

9. The solar power system according to claim 1, wherein the one or more solar energy modules comprise photovoltaic panels.

* * * * *